United States Patent
Knichel et al.

(10) Patent No.: US 9,032,423 B2
(45) Date of Patent: May 12, 2015

(54) DEPENDENCY BASED CONFIGURATION PACKAGE ACTIVATION

(71) Applicant: Microsoft Corporation, Redmond, WA (US)

(72) Inventors: Jason C. Knichel, Seattle, WA (US); Adam Lenart, Seattle, WA (US); James G. Cavalaris, Kirkland, WA (US); Chad R. Siefert, Seattle, WA (US); David J. Roth, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 26 days.

(21) Appl. No.: 13/923,461

(22) Filed: Jun. 21, 2013

(65) Prior Publication Data
US 2014/0380340 A1    Dec. 25, 2014

(51) Int. Cl.
*G06F 13/00* (2006.01)
*G06F 9/44* (2006.01)

(52) U.S. Cl.
CPC .................................. *G06F 9/4411* (2013.01)

(58) Field of Classification Search
CPC ................................ G06F 8/61; G06F 9/4411
USPC .......................................... 717/174; 719/327
See application file for complete search history.

(56) References Cited

U.S. PATENT DOCUMENTS

| | | | |
|---|---|---|---|
| 5,802,365 A | 9/1998 | Kathail et al. | |
| 6,976,252 B2 | 12/2005 | White et al. | |
| 6,978,453 B2 | 12/2005 | Rao et al. | |
| 7,036,007 B2 | 4/2006 | Schelling et al. | |
| 7,146,609 B2 | 12/2006 | Thurston et al. | |
| 7,152,157 B2 * | 12/2006 | Murphy et al. | 713/100 |
| 7,216,344 B2 | 5/2007 | Cobb et al. | |

(Continued)

FOREIGN PATENT DOCUMENTS

WO    WO-2009023296    2/2009

OTHER PUBLICATIONS

"Final Office Action", U.S. Appl. No. 13/534,632, May 22, 2014, 21 pages.

(Continued)

*Primary Examiner* — Andy Ho
(74) *Attorney, Agent, or Firm* — John Jardine; Kate Drakos; Micky Minhas

(57) ABSTRACT

An update platform is described that collectively handles driver and firmware updates for hardware resources of a computing device based on dependencies associated with the updates. The update platform may instantiate representations of each individual hardware resource as abstractions through which detection, analysis, acquisition, deployment, installation, and tracking of updates is managed. Using the representations, the update platform discovers available updates, matches configuration packages for the updates to appropriate resources, and initiates installation of the configuration packages. The update platform is further configured to recognize dependencies associated with the configuration packages. When dependencies are detected, corresponding configuration packages are marked to reflect the dependencies and activation is suspended until the dependencies are satisfied. Upon satisfaction of the dependencies, the dependencies are cleared and the configuration packages are activated. Configuration packages that are not associated with dependencies may be installed and activated "normally" at any time.

20 Claims, 5 Drawing Sheets

(56) References Cited

U.S. PATENT DOCUMENTS

| | | | |
|---|---|---|---|
| 7,376,870 | B2 | 5/2008 | Kataria et al. |
| 7,467,236 | B2 * | 12/2008 | Saito et al. .......... 710/5 |
| 7,747,848 | B1 | 6/2010 | Nallagatla et al. |
| 8,010,959 | B2 | 8/2011 | Mullis, II et al. |
| 8,359,408 | B2 | 1/2013 | Ganga et al. |
| 8,555,043 | B1 | 10/2013 | Nallagatla et al. |
| 8,972,973 | B2 | 3/2015 | Cavalaris et al. |
| 2002/0087734 | A1 | 7/2002 | Marshall et al. |
| 2002/0092008 | A1 | 7/2002 | Kehne et al. |
| 2003/0041088 | A1 | 2/2003 | Wilson et al. |
| 2004/0003103 | A1 | 1/2004 | Witt et al. |
| 2004/0205779 | A1 | 10/2004 | Almeida et al. |
| 2004/0215754 | A1 | 10/2004 | Orleth et al. |
| 2004/0230963 | A1 | 11/2004 | Rothman et al. |
| 2004/0255286 | A1 | 12/2004 | Rothman et al. |
| 2005/0240826 | A1 | 10/2005 | Dickenson et al. |
| 2006/0020937 | A1 | 1/2006 | Schaefer |
| 2006/0130073 | A1 | 6/2006 | Faist et al. |
| 2006/0174240 | A1 | 8/2006 | Flynn |
| 2006/0217111 | A1 | 9/2006 | Marolia et al. |
| 2006/0224874 | A1 | 10/2006 | Lu et al. |
| 2007/0094673 | A1 | 4/2007 | Hunt et al. |
| 2008/0005733 | A1 | 1/2008 | Ramachandran et al. |
| 2008/0028385 | A1 | 1/2008 | Brown et al. |
| 2008/0046877 | A1 | 2/2008 | Ford |
| 2008/0126778 | A1 | 5/2008 | Bishop et al. |
| 2008/0127165 | A1 | 5/2008 | Mullis et al. |
| 2009/0064196 | A1 * | 3/2009 | Richardson et al. .......... 719/327 |
| 2009/0178033 | A1 | 7/2009 | Challener et al. |
| 2009/0307680 | A1 | 12/2009 | Trufinescu et al. |
| 2009/0328023 | A1 | 12/2009 | Bestland et al. |
| 2010/0218178 | A1 | 8/2010 | Sakai |
| 2010/0313191 | A1 | 12/2010 | Yin et al. |
| 2011/0072423 | A1 | 3/2011 | Fukata |
| 2011/0126043 | A1 | 5/2011 | Anderson et al. |
| 2011/0154313 | A1 | 6/2011 | Nolterieke et al. |
| 2011/0271268 | A1 | 11/2011 | Dang |
| 2012/0124567 | A1 | 5/2012 | Landry |
| 2013/0111459 | A1 | 5/2013 | Nakamoto |
| 2013/0179872 | A1 | 7/2013 | Kuzmack et al. |
| 2014/0007073 | A1 | 1/2014 | Cavalaris |
| 2014/0259008 | A1 * | 9/2014 | Bhattiprolu et al. .......... 717/174 |

OTHER PUBLICATIONS

"Intel® Itanium® Processor Family System Abstraction Layer Specification", Revision 3.4, Document No. 245359-009: retrieved from on Apr. 3, 2012, 146 pages.

"Non Final Office Action", U.S. Appl. No. 10/791,586, (Aug. 8, 2006), 7 Pages.

"Notice of Allowance", U.S. Appl. No. 10/791,586, (Jan. 29, 2007), 10 Pages.

"Oracle ILOM Platform Features for the Sun Fire X4170 M2 and X4270 M2 Servers", 3.0 Supplement: retrieved from on Apr. 3, 2012, (2010), 57 pages.

"The Evolution of the Unified Extensible Firmware Interface", retrieved from (2010), 19 pages.

"UEFI Support and Requirements for Windows Operating Systems", retrieved from on Apr. 3, 2012, (Apr. 24, 2009), 7 pages.

Ghosh, "Netdrive: A device Driver Implementation for Mass Storage Sharing on IBM PC Compatibles Over Local and Wide Area Networks", *Local Area Networks, Proceedings of the IFIP TC6 International Conference on Local Area Network*, (Jan. 1990), 10 Pages.

Petridou, Eleonora et al., "Automated Firmware Updating in Large Scale Heterogeneous Systems", *University of Amsterdam, System & Network Engineering*, retrieved from on Apr. 13, 2012,(Mar. 28, 2011), 19 pages.

Sinofsky, Steve "Building Windows for the ARM Processor Architecture", retrieved from on Apr. 12, 2012, (Feb. 9, 2012), 93 pages.

Sinofsky, Steven "Protecting the Pre-OS Environment with UEFI", retrieved from on Apr. 11, 2012, (Sep. 23, 2011), 42 pages.

"Specifying Driver Load Order", Retrieved at Sep. 29, 2011, pp. 4.

"Preparing for Driver Installation", Retrieved at Retrieved Date: Apr. 29, 2013, pp. 1.

"Firmware Update Discovery and Distribution", U.S. Appl. No. 13/534,632, filed Jun. 27, 2012, pp. 55.

"International Search Report and Written Opinion", Application No. PCT/US2013/061091, Dec. 13, 2013, 11 pages.

"Non-Final Office Action", U.S. Appl. No. 13/534,632, Jan. 10, 2014, 21 pages.

"Notice of Allowance", U.S. Appl. No. 13/534,632, Oct. 24, 2014, 14 pages.

* cited by examiner

DEPENDENCY BASED CONFIGURATION PACKAGE ACTIVATION

BACKGROUND

Different hardware resources (e.g., modules, components, and devices) of a computing system may have drivers and firmware for which updates are published from time to time. Traditionally, independent hardware vendors (IHVs) and/or original equipment manufacturers (OEMS) provide install or update packages for their hardware devices that are separately installed using potentially independent and/or proprietary systems for deploying and applying updates. In this traditional scenario, no suitable mechanisms exist for collective management of install or update packages from multiple sources. This may be of particular concern in relation to dependencies that may exist between packages and other software components, states, or actions. In the absence of coordination, some packages are likely to be provisioned on a device before corresponding dependencies are resolved, which can potentially result in erratic or unstable system behavior and/or system crashes. Thus, traditional techniques do not adequately address dependencies that may exist.

SUMMARY

An update platform is described that collectively handles at least driver and firmware updates for hardware resources of a computing device based on dependencies associated with the updates (which as used herein includes initial installs). The update platform may instantiate representations of each individual hardware resource as abstractions through which detection, analysis, acquisition, deployment, installation, and tracking of updates is managed. Using the representations, the update platform discovers available updates, matches configuration packages for the updates to appropriate resources, and initiates installation of the configuration packages. The update platform is further configured to recognize dependencies associated with the configuration packages. When dependencies are detected, one or more corresponding configuration packages are marked to reflect the dependencies and activation is suspended until the dependencies are satisfied. Upon satisfaction of the dependencies, the dependencies are cleared and the configuration packages are activated. Configuration packages that are not associated with dependencies may be installed and activated "normally" at any designated time.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Traditionally, techniques for driver and firmware updates may not provide coordination between different updates, IHVs, and OEMS, and therefore do not adequately address dependencies that may be associated with update packages.

An update platform is described that collectively handles driver and firmware updates (including initial software installs) for hardware resources of a computing device based on dependencies associated with the updates. The update platform may instantiate representations of each individual hardware resource as abstractions through which detection, analysis, acquisition, deployment, installation, and tracking of updates is managed. Using the representations, the update platform discovers available updates, matches configuration packages for the updates to appropriate resources, and initiates installation of the configuration packages. The update platform is further configured to recognize dependencies associated with the configuration packages. When dependencies are detected, corresponding configuration packages are marked to reflect the dependencies and activation is suspended until the dependencies are satisfied. Upon satisfaction of the dependencies, the dependencies are cleared and the configuration packages are activated. Configuration packages that are not associated with dependencies may be installed and activated "normally" at any designated time.

In the discussion that follows, a section titled "Operating Environment" is provided and describes one environment in which one or more embodiments can be employed. Following this, a section titled "Update Platform Details" describes example details and techniques in accordance with one or more implementations. Last, a section titled "Example System" describes example computing systems and devices that can be utilized to implement one or more embodiments.

Operating Environment

Figure 1:
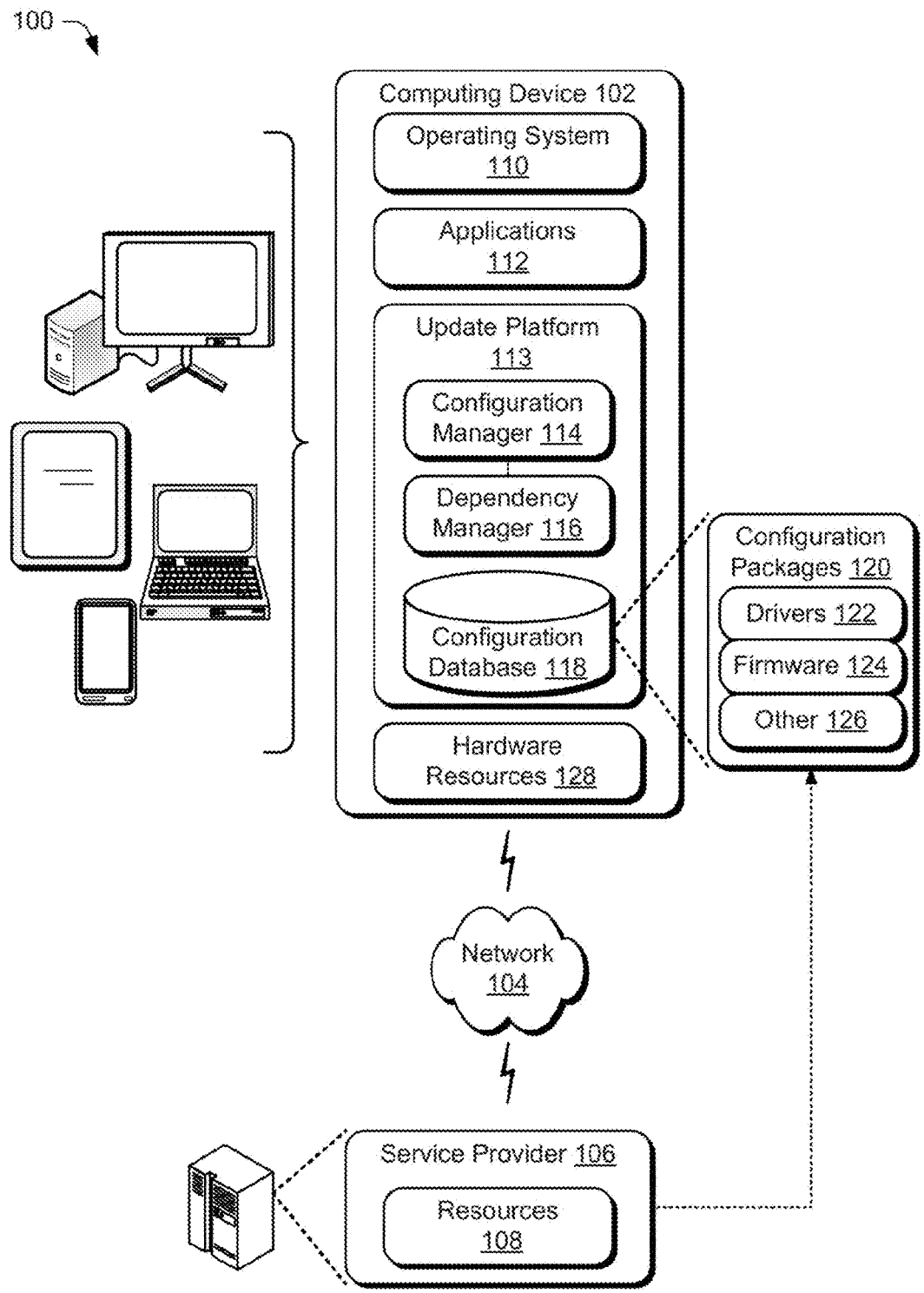
FIG. 1 illustrates an example operating environment in which one or more embodiments of an update platform for dependency based configuration activation can be employed.

FIG. 1 is an illustration of an environment 100 in an example implementation that is operable to employ techniques described herein. The illustrated environment 100 includes a computing device 102 that is communicatively coupled via a network 104 to a service provider 106. The service provider 106 may be configured to make various resources 108 (e.g. content and services) available over the network 104 to the computing device 102 and other clients. Generally, resources 108 made accessible by a service provider 106 may include any suitable combination of services and/or content typically made available over a network by one or more providers. Some examples of services include, but are not limited to, a search service, an email service, an instant messaging service, an online productivity suite, and an authentication service to control access of clients to the resources. Content may include various combinations of text, multi-media streams, documents, application files, photos, audio/video files animations, images, web pages, web applications, device applications, content for display by a browser or other client application, and the like.

The computing device 102 and service provider 106 may be implemented by one or more computing devices and also may be representative of one or more entities. A computing device may be configured in a variety of ways. For example, a computing device may be configured as a computer that is capable of communicating over the network, such as a desktop computer, a mobile station, an entertainment appliance, a set-top box communicatively coupled to a display device, a wireless phone, a game console, and so forth. Thus, the computing device may range from full resource devices with substantial memory and processor resources (e.g., personal computers, game consoles) to a low-resource device with limited memory and/or processing resources (e.g., traditional set-top boxes, hand-held game consoles). Additionally, although a single computing device is shown in some instances, the computing device may be representative of a plurality of different devices, such as multiple servers utilized by the service provider 106.

The computing device 102 is further illustrated as including an operating system 110. The operating system 110 is configured to abstract underlying functionality of underlying hardware to applications 112 that are executable on the computing device 102. For example, the operating system 110 may abstract processing, memory, network, and/or display functionality such that the applications 112 may be written without knowing "how" this underlying functionality is implemented. The applications 112, for instance, may provide data to the operating system 110 to be rendered and displayed by a display device without understanding how this rendering will be performed.

In accordance with techniques described herein, the computing device 102 is also illustrated as having an update platform 113 that can incorporate or make use of a configuration manager 114, dependency manager 116, and a configuration database 118. In some implementations, the update platform 113 may be provided as an operating system component, however, the update platform 113 may also be implemented as a standalone component as illustrated. In general, the update platform 113 represents functionality to acquire, manage, and implement updates to various software modules associated with the computing device 102. In particular, the update platform 113 may be configured as an integrated platform to manage at least driver updates and firmware updates associated with hardware resources of a computing device 102.

In at least some cases, updates may be associated with dependencies. Thus, the update platform 113 is further configured to provide functionality for indicating, recognizing, and managing dependencies associated with the updates as described above and below. The configuration manager 114 represents functionality provided by the update platform 113 or otherwise to acquire configuration packages 120 and manage installation of configuration packages 120 for drivers, and/or firmware. The dependency manager 116 represents functionality operable to recognize dependencies that may be indicated via the configuration packages 120 by explicit declarations or implicitly based on factors such as the form of the updates, contents of a package, type of configuration (e.g., firmware/driver), how configurations are acquired or packaged, and so forth. In response to recognizing dependencies, the dependency manager 116 may further operate to cause placement of configuration packages associated with dependencies into a pending state, evaluate dependencies in response to designated events to ascertain when dependencies are satisfied, and cause activation of configuration packages associated with dependencies via the configuration manager 114 responsive to satisfaction of the dependencies. In an implementation, the dependency manager 116 operates under the direction of the configuration manager 114.

Accordingly, the update platform 113 may represent infrastructure associated with a computing device 102 and/or OS for hardware device management that includes functionality to match updates to hardware resources and initiate execution of configuration packages 120 to apply the updates. As represented in FIG. 1, the configuration packages 120 may include packages that contain drivers 122 and/or firmware 124. The configuration packages 120 may contain various files and settings to implement instances of corresponding software modules. The configuration packages 120 may be stored, installed, and/or maintained within the configuration database 118 of the update platform 113. The configuration database 118 may include both configuration packages placed into a pending state via the dependency manager 116 as described herein and configuration packages that are actively installed via the configuration manager 114. The configuration manager 114 and configuration database 118 may be designed to support side-by-side storage and maintenance of multiple packages for the same hardware resources that may represent different instances or versions of a configuration package. Thus, an update of a driver for a particular hardware device that is placed into a pending state may co-exist in the configuration database 118 alongside an existing instance of the driver (e.g. a previously installed version) that is currently active for interaction with the hardware device.

The configuration packages 120 as used herein generally include packages formatted for consumption by the update platform 113 that relate to software modules, that facilitate operation of and/or interaction with underlying hardware resources 128 of the computing device 102, such as drivers and firmware. The computing device 102 may include a variety of different hardware resources 128 that represent different components and devices typically associated with the computing devices. The hardware resources 128 may include integrated components, removable components, and external peripheral devices connectable to the computing device via wired and/or wireless connections. By way of example and not limitation, hardware resources may include various different radios (cellular, Wi-Fi, GPS/GNSS, NFC, Bluetooth, etc.), sensors (gyroscope, accelerometer, camera, pressure sensor, IR sensor, etc.), components (hard disk, memory, networking devices, general purpose processors, a system-on chip (SoC) processor, hardware logic devices, micro-controllers, etc.), peripheral devices (printers, monitors, graphics cards, flash drives, storage drives, etc.), and so forth. At least some of the hardware resources 128 include drivers and/or firmware that may be updated in accordance with the techniques described above and below.

In one approach, update platform 113 is configured to extend techniques, infrastructure, and user interfaces provided by the operating system for management of plug and play devices to support collective driver and/or firmware updates including dependency management. More generally, detecting and distributing of updates may be performed through built-in operating system infrastructure that is extended to handle multiple types of updates, such as driver updates, firmware updates, and so forth. To make use of device management infrastructure, for example, each resource having updatable components may be represented as a plug and play device. Different resources are assigned identifiers to reference and distinguish between the resources. The resources may then be discoverable via operating system APIs or other comparable functionality for device management. The representations may also include information that may be used to filter and categorize entries. The filter/category information enables the OS to selectively retrieve, list, expose, and/or interact with representations for resources having updateable components.

Once resources are represented as plug and play devices, driver and/or firmware updates for the resources may be acquired, processed, and distributed in a consistent manner through the update platform 113. The representations are created to virtualize the resources as software abstractions with respect to an operating system. The representations may be in the form of objects, records, list items, and/or files that correspond to each resource. Creating representations for the enumerated resources effectively registers the enumerated resources for handling of updates through the update platform 113. Moreover, the infrastructure and representations may be employed by the update platform 113 to implement dependency based configuration activation techniques described herein. Naturally, the update platform 113 may alternatively implement comparable functionality to create virtual representations of the underlying hardware and to handle updates for the resources, independent of techniques, infrastructure, and user interfaces provided by the operating system for management of plug and play devices.

Having described an example operating environment, consider now example details regarding dependency based configuration activation techniques in accordance with one or more embodiments.

Update Platform Details

In the following section, implementation details and example techniques for an update platform configured to collectively handle driver and firmware updates for hardware resources of a computing device based on dependencies associated with the updates are discussed. The discussion includes some example procedure(s) that can be implemented in connection with any suitable hardware, software, firmware, or combination thereof. Aspects of each of the procedures described below may be implemented in hardware, firmware, or software, or a combination thereof. The procedures are shown as a set of blocks that specify operations performed by one or more devices and are not necessarily limited to the orders shown for performing the operations by the respective blocks. In at least some embodiments, the procedures may be implemented by way of a suitably configured computing device, such as the example computing device 102 of FIG. 1 that includes or otherwise makes use of an update platform 113.

Figure 2:
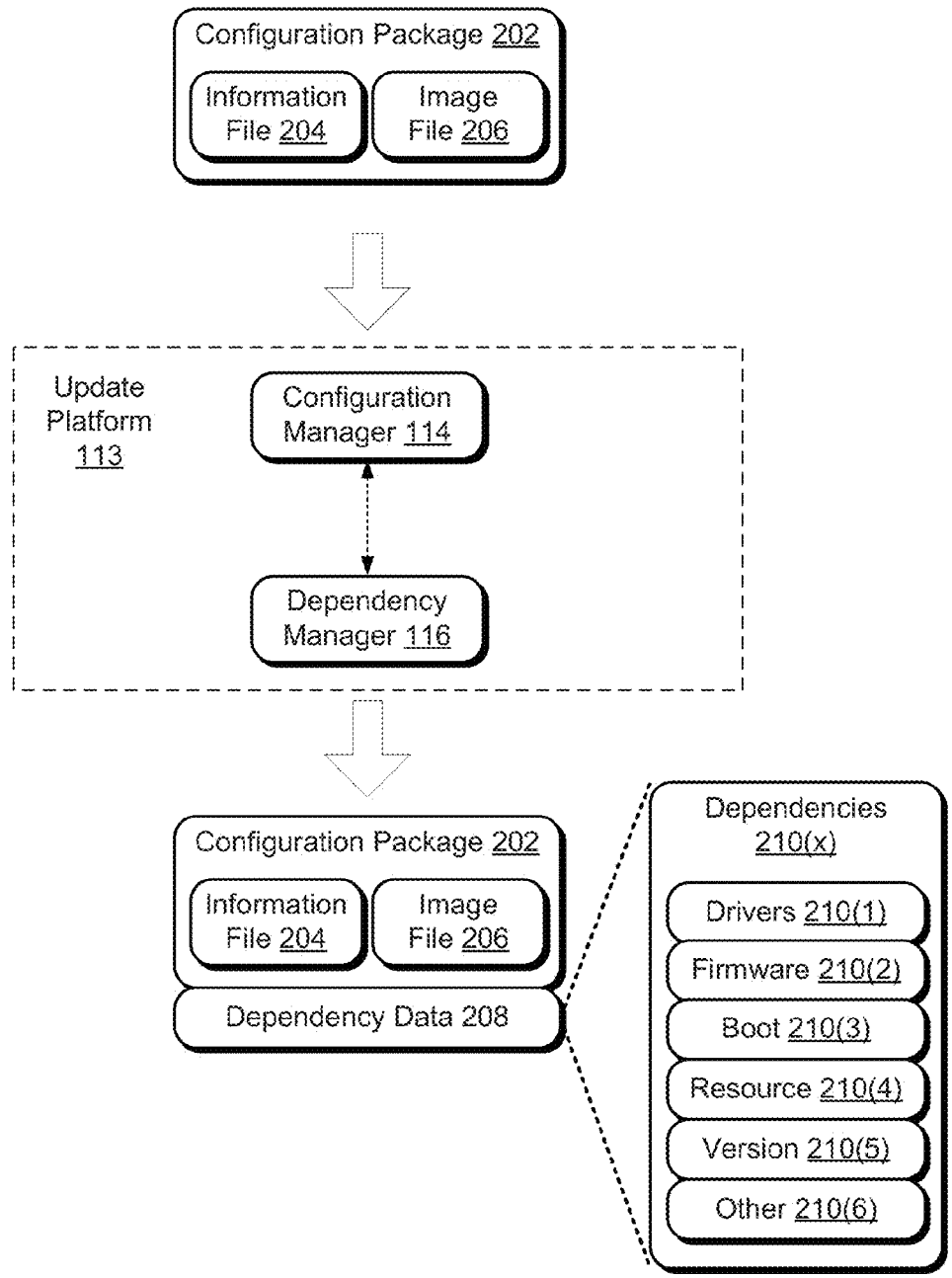
FIG. 2 is a diagram showing an example scenario for association of dependencies with a configuration package in accordance with one or more implementations.

By way of example, FIG. 2 depicts generally at 200 an example scenario for dependency based configuration activation in accordance with one or more implementations. Here, an example configuration package 202 is depicted that includes an information file 204 and an image file 206. The configuration package 202 may correspond to a particular instance or version of a driver or firmware. The information file represents various set-up data, descriptors, factors and/or declarations that may be employed to set-up and effectuate installation and activation of the associated package. In at least some embodiments, the information file 204 may contain declarations to explicitly indicate various dependencies associated with the configuration package 202. The dependency declarations may be configured in any suitable format that is recognizable by the update platform 113 and in particular the dependency manager 116. For example, the dependency declarations may be configured as XML or other structured data, textual strings, metadata field, numerical designators, or symbolic indicators, to name a few examples, or another designated format. Dependencies may also be implicitly indicated by packages based upon factors such as the form/structure of the updates, contents of a package, type of configuration (e.g., firmware/driver), how configurations are acquired or packaged, the environment in which one or more packages are acquired, and so forth. The image file 204 represents the implementing code, resources, settings, and other files or data for the particular instance or version of software corresponding to the configuration package 202.

In operation, the configuration manager 114 may acquire the configuration package 202 and initiate updating of a corresponding component (e.g., driver, firmware, etc.) associated with a hardware resource 128. The configuration manager 114 may be configured to invoke and direct the dependency manager 116 to perform operations to manage dependencies that may be associated with configuration packages that the configuration manager 114 obtains and processes.

The dependency manager 116 for instance may examine the configuration package 202 to discover indications of one or more dependencies associated with the configuration package. In particular, the dependency manager 116 may parse the package to recognize explicit dependency declarations that are encoded in configuration package in a designated format. In addition or alternatively, the dependency manager 116 may recognize indications of dependencies based on examination of implicit factors including but not limited to the examples noted herein. The dependency manager 116 may map the dependency indications to corresponding dependencies and form corresponding dependency data 208 to describe the dependencies in a manner understandable by the update platform 113. For example, descriptive indications may be mapped to numeric codes, and vice versa, structured data may be interpreted and reformatted, symbolic indicators may be converted, and so forth. Additionally or alternatively, dependency indications encoded in the configuration package may be in a form directly consumable by the update platform and/or dependency manager to control activations accordingly. In any event, the dependency manager 116 generates dependency data 208 in an appropriate, designated format. Then, the dependency manager 116 may append dependency data 208 to the configuration package 202 (as shown), link the data to the package, inject the data into the package, or otherwise associate the dependency data 208 with the configuration package 202.

Dependency data 208 may be configured in various ways to describe different types of dependencies 210(x) that are supported by the update platform 113 and therefore may be indicated by configuration packages 120. In one approach, the dependency data 208 comprises a list that includes individual entries for each dependency associated with configuration. The entries may define properties associated with a configuration that indicate corresponding dependencies. The dependency manager 116 may reference the list to evaluate the properties at particular designated times, such as upon a reboot, on-demand, when an update management application is launched, or at a periodic interval. Upon satisfaction of items in the list, the properties may be cleared or otherwise marked as completed. When each of the dependencies in the list is resolved, the dependency manager 116 may cause activation of the corresponding package to proceed through the configuration manager.

A variety of different types of dependencies may be supported by the update platform 113 including but not limited to dependency upon a system reboot, dependencies between drivers and firmware, dependencies between drivers and other drivers, and dependencies on particular software components. Some example dependencies 210(x) that may be associated with drivers, firmware, and/or other software modules are depicted in FIG. 2. For instance, dependencies 210(x) may include dependencies on drivers 210(1) or firmware 210(2), a boot 210(3) dependency on a system reboot or boot state, a resource 210(4) dependency upon the presence of a file, library, service, application, or other particular software components, and/or a version 210(5) dependency upon a designated version or minimum version (e.g., version 4.1 or above) of a resource/software component, to name a few examples. Other 210(6) types of dependencies are also contemplated, such as dependencies upon designated states or actions related to software components, settings, and cross dependencies between drivers, between firmware, and/or between drivers and firmware. Further details regarding techniques for dependency based configuration activation are discussed in relation to the following example procedures.

Figure 3:
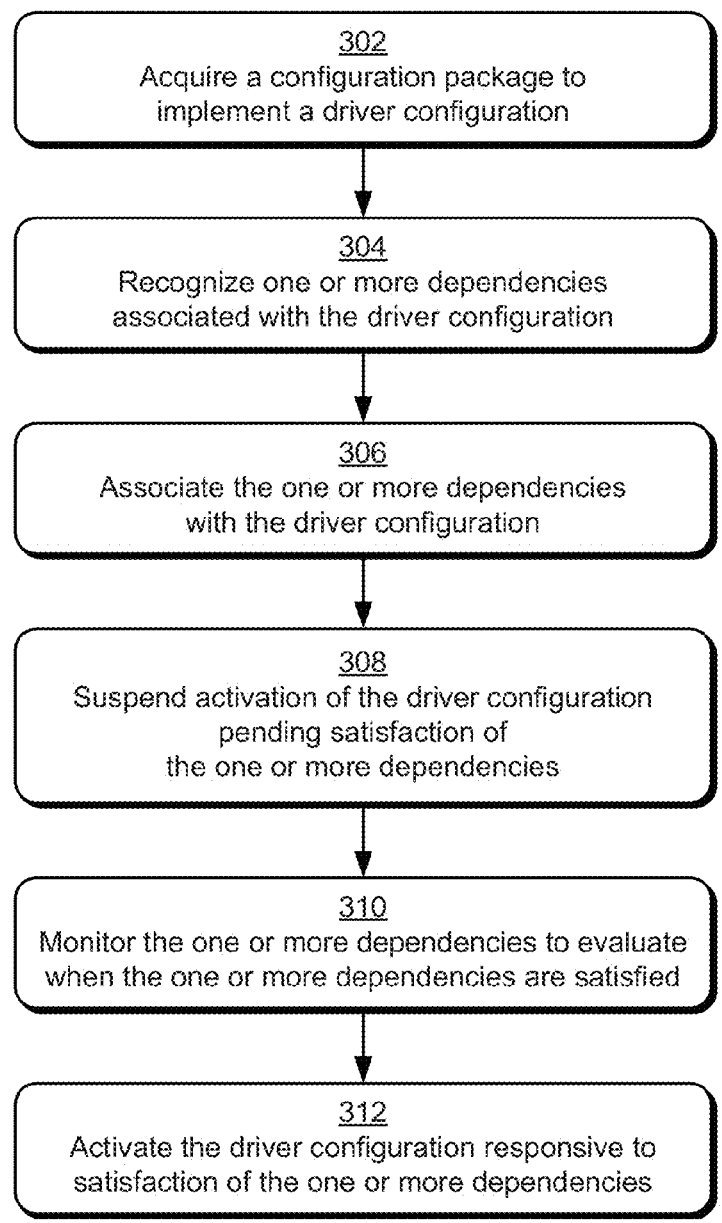
FIG. 3 is a flow diagram that describes details of an example procedure for dependency based configuration activation in accordance with one or more implementations.

FIG. 3 depicts an example procedure 300 in which a driver configuration is activated in accordance with one or more dependencies. Although, aspects of the procedure 300 are described in relation to a driver configuration of a driver update for a hardware resource, the techniques are equally applicable to firmware updates and other software component updates supported by the update platform 113. As mentioned, the update platform 113 may be configured as an integrated platform to support collective driver and/or firmware updates including dependency management. In one approach, firmware update packages and other configuration packages 120 may be formed in the same format as driver packages that the infrastructure recognizes and is able to handle. The format employed for device driver packages does not constrain the underlying payload of the package with respect to what type of payload can be delivered. Thus, various types of configuration packages 120 described herein may be contained in "driver style" packages for consumption by the update platform 113 or other operating system infrastructure designed to handle driver updates. Accordingly, the device management infrastructure may be leveraged to handle and distribute firmware update packages in addition to other kinds of packages, such as driver update packages.

A configuration package is acquired to implement a driver configuration (block 302). For example, a configuration package 120 may be accessed and download from an update service accessible over a network 104 via a service provider 106. Configuration packages may also be distributed on some form of computer-readable media, such as a digital disk, a flash drive, floppy disk, and so forth. The configuration package may correspond to an update for a driver, firmware, or other software component associated with a hardware resource 128.

One or more dependencies associated with the driver configuration are recognized (block 304) and the one or more dependencies are associated with the driver configuration (block 306). Further, activation of the driver configuration is suspended pending satisfaction of the one or more dependencies (block 308). Various dependencies 210(x) that are supported by an update platform may be indicated by a configuration package as previously described. A dependency manager 116 or other comparable functionality may be configured to detect dependency indications in various formats and in various ways. This may involve parsing a configuration package to discover explicit declarations of one or more dependencies encoded in the configuration package. In addition or alternatively, this may involve examining various implicit factors for the configuration package indicative of corresponding dependencies.

In response to recognition of one or more dependencies indicated by a configuration package, the dependency manager 116 may generate corresponding dependency data 208 in an appropriate format and associate the dependency data 208 with the configuration package. This may occur by creating and appending a dependency list to the configuration package or in another suitable manner as described previously. Association of the dependencies with the configuration package marks the package to the platform as having the dependencies and is effective to cause activation of the driver configuration to be suspended until the one or more dependencies are satisfied.

In particular, suspension of the configuration places settings and files of the driver configuration into a pending state so that the settings and files are not active and may not be employed. In addition or alternatively, a representation of a corresponding hardware resource within the update platform may be marked to indicate the pending state. This may occur by setting a designated field, parameter, property, or other value associated with the representation to denote the pending state. The pending state is recognizable by the update platform 113 and may be employed to selectively suspend activation of the driver configuration and cause activation to occur upon resolution of the one or more dependencies. Subsequent activation of the driver configuration may involve removing the pending state and applying the settings and files of the driver configuration that were suspended.

The one or more dependencies are monitored to evaluate when the one or more dependencies are satisfied (block 310) and the driver configuration is activated responsive to satisfaction of the one or more dependencies (block 312). Here, the dependency manager 116 may operate to check whether the dependencies are satisfied at various times. The evaluation of dependencies may occur in response to various designated events or triggers. For instance, dependencies may be evaluated each time the system boots. In addition or alternatively, an evaluation may be triggered by other designated events such as download of configuration packages, a periodic interval, launch of an update management application, prompting by an update service, on-demand at the direction of a user, and so forth. Evaluations may continue to occur until the platform determines that each dependency is resolved. Then, suspension of the activation is removed and the driver configuration may be activated. This may involve deleting or clearing the dependencies, marking the dependencies as complete, or otherwise updating dependency data 208 to reflect satisfaction of the dependencies. The configuration manager 114 may then be invoked to install and/or activate the configuration package 120.

Figure 4:
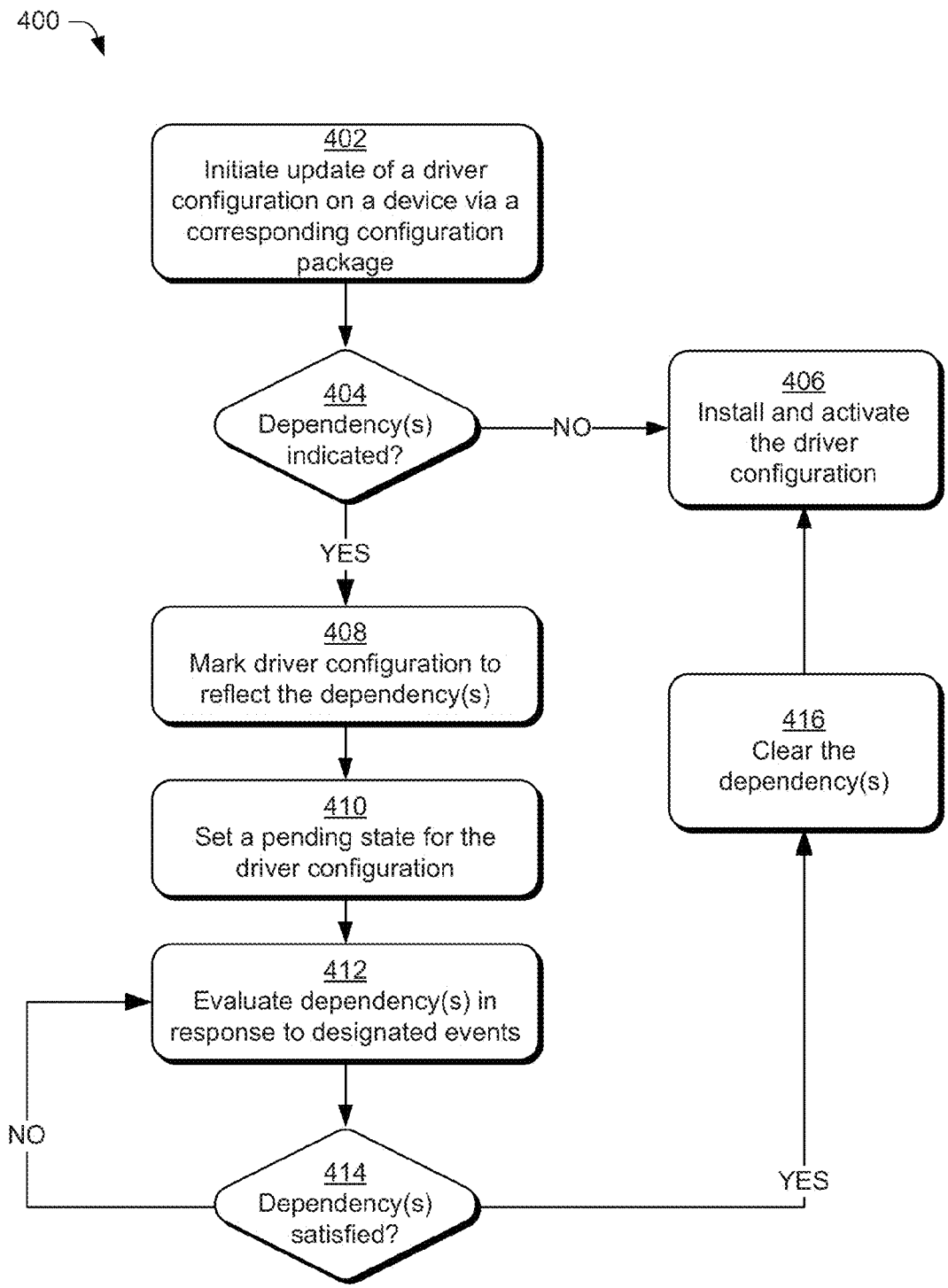
FIG. 4 is a flow diagram that describes details of another example procedure for dependency based configuration activation in accordance with one or more implementations.

FIG. 4 depicts another example procedure 400 in which a configuration package may be selectively activated based on dependencies. Update of a driver configuration via a corresponding configuration package is initiated on a device (block 402). This may occur responsive to acquiring the package, upon system boot, in connection with an on-demand install, and so forth. A determination is then made regarding whether the configuration package indicates a dependency(s) (block 404). The determination may occur by referencing declarations contained in or otherwise indicated by a configuration package in the manner previously described. If the configuration package does not indicate dependencies, the driver configuration is installed and activated (block 406). Here, the configuration manager 114 may handle the configuration package in a "normal" manner and the configuration package may be installed at any time. For instance, the configuration package may be installed or activated immediately without delay. In addition or alternatively, the configuration package may be queued in an installation queue for activation in turn after other installs.

On the other hand, if the configuration package indicates at least one dependency, the driver configuration is marked to reflect the dependency(s) (block 408) and a pending state is set for the driver configuration (block 410). The marking may involve forming and writing dependency data 208 to the driver configuration or otherwise associating dependency data that describes the dependencies of the configuration. Optionally, a designated field, parameter, or property associated with the configuration package may also be set to a pending state to indicate to the platform that the package has unresolved dependencies and is suspended from activation pending satisfaction of the dependencies. Alternatively, associating dependency data 208 with the configuration may be effective to place the configuration in a pending state.

Subsequently, the dependency(s) is evaluated in response to designated events (block 412) and a determination is then made based on the evaluation regarding whether the dependency(s) is satisfied (block 414). Evaluation of dependencies may occur in response to various designated events or triggers as noted above. In the event that each dependency associated with the driver configuration is satisfied, the dependencies are cleared (block 416) and the driver configuration may be installed and activated as per block 406. On the other hand, as long as at least one dependency remains, the evaluation and determination of blocks 412 and 414 regarding satisfaction of the dependency(s) may continue in response to designated events and may be repeated until dependency associated with the driver configuration is satisfied.

Having considered example details and techniques regarding an update platform that implements dependency based configuration activation, consider a discussion of an example system in accordance with one or more embodiments.

Example System

Figure 5:
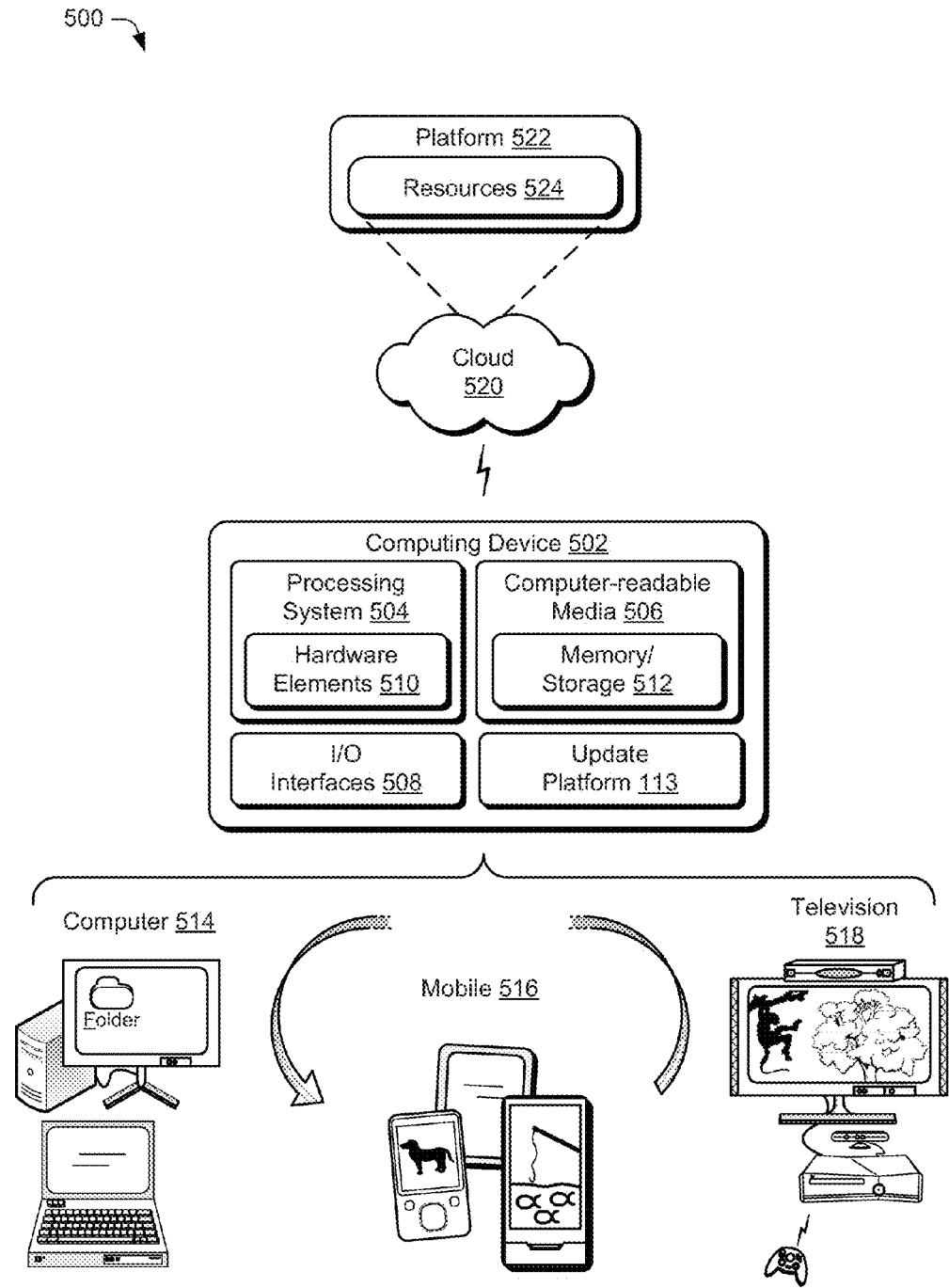
FIG. 5 is a block diagram of a system that can implement various embodiments.

FIG. 5 illustrates an example system 500 that includes an example computing device 502 that is representative of one or more computing systems and/or devices that may implement the various techniques described herein. The computing device 502 may be, for example, a server of a service provider, a device associated with a client (e.g., a client device), an on-chip system, and/or any other suitable computing device or computing system.

The example computing device 502 as illustrated includes a processing system 504, one or more computer-readable media 506, and one or more I/O interfaces 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware elements 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 506 is illustrated as including memory/storage 512. The memory/storage 512 represents memory/storage capacity associated with one or more computer-readable media. The memory/storage 512 may include volatile media (such as random access memory (RAM)) and/or nonvolatile media (such as read only memory (ROM), Flash memory, optical disks, magnetic disks, and so forth). The memory/storage 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

Input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone for voice operations, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "communication media."

"Computer-readable storage media" refers to media and/or devices that enable storage of information in contrast to mere signal transmission, carrier waves, or signals per se. Thus, computer-readable storage media does not include signal bearing media or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to signal-bearing media that is configured to transmit instructions to the hardware of the computing device 502, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 510 and computer-readable media 506 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including the operating system 110, applications 112, update platform 113, configuration manager 114, dependency manager 116, and other program modules may be implemented as one or more instructions and/or logic embodied on some form of computer-readable storage media and/or by one or more hardware elements 510. The computing device 502 may be configured to implement particular instructions and/or functions corresponding to the software and/or hardware modules. Accordingly, implementation of modules as a module that is executable by the computing device 502 as software may be achieved at least partially in hardware, e.g., through use of computer-readable storage media and/or hardware elements 510 of the processing system. The instructions and/or functions may be executable/operable by one or more articles of manufacture (for example, one or more computing devices 502 and/or processing systems 504) to implement techniques, modules, and examples described herein.

As further illustrated in FIG. 5, the example system 500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 500, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 502 may assume a variety of different configurations, such as for computer 514, mobile 516, and television 518 uses. Each of these configurations includes devices that may have generally different constructs and capabilities, and thus the computing device 502 may be configured according to one or more of the different device classes. For instance, the computing device 502 may be implemented as the computer 514 class of a device that includes a personal computer, desktop computer, a multi-screen computer, laptop computer, netbook, and so on.

The computing device 502 may also be implemented as the mobile 516 class of device that includes mobile devices, such as a mobile phone, portable music player, portable gaming device, a tablet computer, a multi-screen computer, and so on. The computing device 502 may also be implemented as the television 518 class of device that includes devices having or connected to generally larger screens in casual viewing environments. These devices include televisions, set-top boxes, gaming consoles, and so on.

The techniques described herein may be supported by these various configurations of the computing device 502 and are not limited to the specific examples of the techniques described herein. This is illustrated through inclusion of the update platform 113 on the computing device 502. The functionality represented by the update platform 113 and other modules/applications may also be implemented all or in part through use of a distributed system, such as over a "cloud" 520 via a platform 522 as described below.

The cloud 520 includes and/or is representative of a platform 522 for resources 524. The platform 522 abstracts underlying functionality of hardware (e.g., servers) and software resources of the cloud 520. The resources 524 may include applications and/or data that can be utilized while computer processing is executed on servers that are remote from the computing device 502. Resources 524 can also include services provided over the Internet and/or through a subscriber network, such as a cellular or Wi-Fi network.

The platform 522 may abstract resources and functions to connect the computing device 502 with other computing devices. The platform 522 may also serve to abstract scaling of resources to provide a corresponding level of scale to encountered demand for the resources 524 that are implemented via the platform 522. Accordingly, in an interconnected device embodiment, implementation of functionality described herein may be distributed throughout the system 500. For example, the functionality may be implemented in part on the computing device 502 as well as via the platform 522 that abstracts the functionality of the cloud 520.

Conclusion

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented by a computing device comprising:
   acquiring a configuration package to implement a driver configuration;
   recognizing one or more dependencies associated with the driver configuration;
   associating the one or more dependencies with the driver configuration;
   suspending activation of the driver configuration pending satisfaction of the one or more dependencies; and
   interacting with a hardware device associated with the driver configuration via a previously installed version of the driver configuration pending satisfaction of the one or more dependencies.

2. The method of claim 1, further comprising:
   monitoring the one or more dependencies to evaluate when the one or more dependencies are satisfied.

3. The method of claim 2, further comprising:
   activating the driver configuration responsive to satisfaction of the one or more dependencies.

4. The method of claim 1, wherein the driver configuration is associated with a firmware update for a device that is packaged as a driver update handled through operating system infrastructure designed to handle driver updates.

5. The method of claim 1, wherein acquiring a configuration package comprises receiving the configuration package as an update over a network from an update service available from a service provider.

6. The method of claim 1, wherein the configuration package is configured for consumption by an update platform designed as an integrated platform to manage both driver updates and firmware updates associated with hardware resources of a computing device, including managing dependencies associated with the updates.

7. The method of claim 1, wherein recognizing the one or more dependencies associated with the driver configuration comprises examining the configuration package to discover indications of the one or more dependencies reflected by the configuration package, the indications including one or more of: explicit declarations or implicit factors indicative of corresponding dependencies.

8. The method of claim 1, wherein associating the one or more dependencies with the driver configuration comprises generating dependency data to describe the one or more dependencies and associating the dependency data with the driver configuration.

9. The method of claim 8, wherein the dependency data comprises a dependency list that is appended to the configuration package and includes individual entries for each dependency associated with the driver configuration.

10. The method of claim 1, wherein the one or more dependencies comprise at least a dependency between a driver and firmware associated with a particular hardware resource associated with the computing device.

11. The method of claim 1, wherein the one or more dependencies comprise a dependency upon a system reboot of the computing device.

12. The method of claim 1, wherein the driver configuration contains one or more of set-up data, descriptors, declarations, image files, resource files, code, or system settings to enable installation and operation of a driver to facilitate interaction with a corresponding hardware resource of the computing device.

13. The method of claim 1, wherein suspending activation of the driver configuration comprises placing settings and files of the driver configuration into a pending state and marking a representation of a corresponding hardware resource to cause activation of the driver configuration upon resolution of the one or more dependencies by applying the settings and files of the driver configuration.

14. One or more computer-readable storage media storing instructions that when executed by a computing device cause the computing device to implement an update platform to perform acts comprising:
   initiating an update of a driver configuration at the computing device via a corresponding configuration package;
   ascertaining whether one or more dependencies for the driver configuration are indicated by the configuration package;
   when one or more dependencies are indicated:
      marking the driver configuration to reflect the one or more dependencies;
      setting a pending state for the driver configuration;
      evaluating indicated dependencies for the driver configuration in response to designated events; and
      responsive to said evaluating determining one or more of the indicated dependencies are not satisfied, continuing to evaluate the indicated dependencies for the driver configuration in response to the designated events until the indicated dependencies are satisfied; or
   when one or more dependencies are not indicated:
      installing and activating the driver configuration.

15. One or more computer-readable storage media of claim 14, wherein the update platform is configured to perform acts comprising:
   ascertaining that the indicated dependencies are satisfied based upon the evaluation;
   clearing the dependencies; and
   installing and activating the driver configuration.

16. One or more computer-readable storage media of claim 14, wherein the one or more dependencies supported by the update platform and detectable via configuration packages comprise one or more of:
   a dependency upon a system reboot of the computing device;
   a dependency of a firmware update upon a driver update for a particular hardware resource;
   a dependency of a driver update upon a firmware update for a particular hardware resource;
   a cross dependency between a driver update and a firmware update;
   a resource based dependency upon a particular software component; or
   a version based dependency upon a particular software component.

17. One or more computer-readable storage media of claim 14, wherein update platform is configured to provide infrastructure integrated with an operating system of the computing device to manage both driver updates and firmware updates associated with hardware resources of the computing device.

18. A computing device comprising:
   one or more hardware resources having updateable drivers and firmware; and
   an update platform configured to collectively handle updates to the drivers and firmware associated with the hardware resources including:
      a configuration manager to acquire and manage installation of configuration packages for the drivers and firmware associated with the hardware resources in accordance with dependencies declared via the configuration packages, including interact with a hardware resource associated with a configuration package via a previously installed version of the driver configuration pending satisfaction of the dependencies;

a dependency manager operable under the direction of the configuration manager to recognize dependencies indicated by the configuration packages, cause placement of configuration packages associated with dependencies into a pending state, evaluate dependencies in response to designated events to ascertain when dependencies are satisfied, and cause activation of configuration packages associated with dependencies via the configuration manager responsive to satisfaction of the dependencies; and a configuration database to maintain configuration packages for the drivers and firmware that contain corresponding files and settings to implement the drivers and firmware.

19. The computing device of claim 18, wherein the configuration database includes both configuration packages placed into a pending state via the dependency manager and configuration packages that are actively installed via the configuration manager.

20. The computing device of claim 18, wherein the dependency manager is configured to recognize and support multiple types of dependencies for the updates to the drivers and firmware including a dependency upon a system reboot, dependencies between drivers and firmware, and dependencies on a particular software component.

* * * * *